US005668541A

United States Patent [19]

Coquin et al.

[11] Patent Number: 5,668,541
[45] Date of Patent: Sep. 16, 1997

[54] SYSTEM FOR DERIVING AN ANOMALY SIGNAL DURING THE TAKE-OFF OF AN AIRCRAFT

[75] Inventors: Laurent Coquin, Toulouse; Christine Le Draoullec, Plaisance du Touch, both of France

[73] Assignee: Aerospatiale Societe Nationale Industrielle, Paris, France

[21] Appl. No.: 635,977

[22] PCT Filed: Sep. 25, 1995

[86] PCT No.: PCT/FR95/01230

§ 371 Date: May 9, 1996

§ 102(e) Date: May 9, 1996

[87] PCT Pub. No.: WO96/10222

PCT Pub. Date: Apr. 4, 1996

[30] Foreign Application Priority Data

Sep. 28, 1994 [FR] France .................................. 94 11574

[51] Int. Cl.⁶ .................................................. G08B 21/00
[52] U.S. Cl. .................................. 340/959; 340/972; 701/15
[58] Field of Search ...................... 340/959, 963, 340/945, 972; 364/427; 73/178 T

[56] References Cited

U.S. PATENT DOCUMENTS

| 3,034,096 | 5/1962 | Craddock | 340/959 |
|---|---|---|---|
| 3,120,658 | 2/1964 | Lukesh et al. | 340/959 |
| 3,368,065 | 2/1968 | Kendall | 340/959 |
| 4,454,582 | 6/1984 | Cleary et al. | 364/427 |
| 4,638,437 | 1/1987 | Cleary et al. | 364/427 |
| 4,773,015 | 9/1988 | Leland et al. | 364/427 |
| 4,843,554 | 6/1989 | Middleton et al. | 364/427 |
| 5,047,942 | 9/1991 | Middleton et al. | 364/427 |
| 5,124,700 | 6/1992 | Bonafé | 340/959 |
| 5,353,022 | 10/1994 | Middleton et al. | 340/959 |

FOREIGN PATENT DOCUMENTS

| 2650101 | 1/1991 | France . |
|---|---|---|
| WO 85/01372 | 3/1995 | WIPO . |

OTHER PUBLICATIONS

"Evaluation of a Takeoff Performance Monitoring System Display", Middleton et al. J. Guidance, V.12, No. 3, pp. 640–646.

"System Predicts Critical Runway Performance Paremeters", Millen, et al., NASA Tech Brief, p. 292.

*Primary Examiner*—Thomas Mullen
*Assistant Examiner*—Benjamin C. Lee
*Attorney, Agent, or Firm*—Fisher, Christen & Sabol

[57] ABSTRACT

System for deriving an information, warning or alarm signal on board an aircraft in the event of an anomaly during take-off.

According to the invention, the system comprises:

means (4) for calculating the position $D_{stop}$ on the runway where the aircraft must stop if the pilot decides to interrupt the take-off procedure immediately, that is to say representative of the stopping distance of the aircraft during the acceleration phase of the latter at take-off; means (5) for comparing $D_{stop}$ to the length of runway L available so as to determine whether an interruption of the take-off is still possible.

8 Claims, 5 Drawing Sheets

SYSTEM FOR DERIVING AN ANOMALY SIGNAL DURING THE TAKE-OFF OF AN AIRCRAFT

The present invention relates to a system for deriving an information, warning or alarm signal on board an aircraft in the event of an anomaly during take-off.

The take-off procedure, from releasing the brakes until the aircraft lifts off, constitutes a sensitive phase in the operation of the aircraft, during which, owing to losses of performance, changes as far as the direction and the strength of the wind are concerned, or for other reasons, accidents or incidents, the probability of which has been evaluated at about $10^{-6}$ per take-off, may take place. In consequence, it is necessary, in order to enhance safety, to supply the crew, in good time, with reliable and precise information allowing them to decide whether the take-off procedure should be interrupted or corrected, and to do so before the aircraft, rolling on the runway, reaches a critical speed V1, obtained by a theoretical calculation, defined as the speed up to which the take-off may be interrupted and beyond which the take-off must be proceeded with.

Already known, from the Applicant's Patent FR-2,650,101, is such a system for deriving an information, warning or alarm signal on board an aircraft in the event of an anomaly during take-off, before the aircraft reaches a critical rolling speed up to which the take-off procedure may be modified or interrupted and beyond which the take-off must be proceeded with, which includes:

means for calculating the expression:

$$D_1 = D_1 t + (Vat^2 - V_{11}t^2)/2\gamma_1 t$$

in which:

$\gamma_1 t$ is the actual acceleration of the aircraft at the instant $\underline{t}$, $V_{11}t$ is the actual speed of the aircraft at the instant $\underline{t}$, Vat is the theoretical speed of the aircraft at the instant $\underline{t}$, $D_1 t$ is the actual distance travelled by the aircraft at the instant $\underline{t}$, and $D_1$ is the anticipated actual distance travelled by the aircraft when $V_{11}t$ will be equal to Vat, as well as the ratio:

$$D_1/\text{Dat}$$

in which:

$D_1$ is as defined above, and

Dat is the theoretical distance travelled by the aircraft at the instant $\underline{t}$;

means for processing the information, warning or alarm signal, comprising means for comparing the ratio $D_1/\text{Dat}$ to a predetermined threshold S guaranteeing a minimum safety distance, especially for the braking and stopping of the aircraft; and information, warning or alarm means capable of sending out an information, warning or alarm signal when said ratio $D_1/\text{Dat}$ is above or equal to said threshold.

The system of Patent FR-2,650,101 thus makes it possible to derive an information, warning or alarm signal on board an aircraft in the event of an anomaly during take-off. This signal is only supplied when the speed of the airplane and the distance which it has travelled along the runway are, respectively, less than the decision speed (critical speed V1) and less than the theoretical distance travelled with which it is associated, in order to allow, if necessary, an interruption of the take-off in complete safety.

However, with such a system, the transition between the moment when an interruption of the take-off is still possible and the moment when it is no longer possible is very sudden. At a given instant, the system no longer supplies information to the aircraft's pilot.

However, the pilot does not know exactly when this transition will occur. Moreover, in the event of a problem, the pilot does not know at any moment the braking margin that he has available.

By way of example, we will assume that an alarm occurs before V1. By definition, an interruption of the take-off is still possible. The aircraft has not yet reached the critical speed and the actual distance travelled by the aircraft is not yet greater, by more than the predefined threshold (for example 15%), than the theoretical distance which it ought to have travelled. However, it will very soon be so since an alarm has been triggered. If the pilot does not react immediately, nothing will guarantee that he will be able actually to stop the aircraft within the limit of distances available.

The object of the present invention is to avoid these drawbacks and relates to a system, of the previously defined type, which is improved in order to supply the pilot with new information enabling him to refine his judgement as to continuing, or not, the take-off procedure in the event of an anomaly.

For this purpose, the system for deriving an information, warning or alarm signal on board an aircraft in the event of an anomaly during take-off, before the aircraft reaches a critical rolling speed up to which the take-off process may be modified or interrupted and beyond which the take-off must be proceeded with, of the type including:

first means for calculating the expression:

$$D_1 = D_1 t + (Vat^2 - V_{11}t^2)/2\gamma_1 t$$

in which:

$\gamma_1 = t$ is the actual acceleration of the aircraft at the instant $\underline{t}$, $V_{11}t$ is the actual speed of the aircraft at the instant $\underline{t}$, Vat is the theoretical speed of the aircraft at the instant $\underline{t}$, $D_1 t$ is the actual distance travelled by the aircraft at the instant $\underline{t}$, and $D_1$ is the anticipated actual distance travelled by the aircraft when $V_{11}t$ will be equal to Vat, as well as the ratio:

$$D_1/\text{Dat}$$

in which:

$D_1$ is as defined above, and Dat is the theoretical distance travelled by the aircraft at the instant $\underline{t}$;

first means for comparing the ratio $D_1/\text{Dat}$ to a predetermined threshold S; and information, warning or alarm means;

is remarkable, according to the invention, in that it furthermore comprises:

second means for calculating the expression:

$$D_{stop} = D_1 t + V_{11} t (\Delta T1 + \Delta T2) - 1/\gamma P[\gamma ct/\gamma P(\ln|\gamma ct|-1) + V_{11} t \ln|\gamma bt| - \gamma bt/\gamma P(\ln|\gamma bt|-1)]$$

in which, in addition to the parameters already defined hereinabove:

ΔT1 is the reaction time of the aircraft's pilot,

ΔT2 is the response time of the braking means,

γbt is the acceleration of the aircraft at the start of braking,

γct is the acceleration of the aircraft at the end of braking,

γP=(γbt−γct)/V₁₁t, $D_{stop}$ represents the position on the runway where the aircraft must stop if the pilot decides to interrupt the take-off procedure immediately, that is to say is representative of the stopping distance of the aircraft during the acceleration phase of the latter at take-off;

second means for comparing $D_{stop}$ to the length of runway L available so as to determine whether an interruption of the take-off is still possible;

said information, warning or alarm means being activated depending on the information supplied by said first and second comparison means in order to enable the pilot to decide whether he should continue the take-off procedure or not.

Thus, by continuously calculating, especially during the acceleration phase of the aircraft at takeoff, the distance required by the aircraft (including the distance already travelled) in order to stop and by comparing it to the length of runway available, the pilot has at his disposal continuous information about the braking margin and, consequently, about the decision time available to him. For example, in the event of a problem during a take-off with a thrust less than the maximum thrust, if the pilot still has a considerable decision margin available, he may especially try to reestablish full take-off thrust, even if this entails interrupting the take-off a little later should the increase in thrust thus supplied not be sufficient for a safe situation to be resumed.

Advantageously, the system comprises third means for calculating the expression:

$$V_{max} = \sqrt{V_{11}t^2 - 2\gamma bt(L - D_{stop})}$$ , $V_{max}$ being the maximum speed of the aircraft enabling it, from its actual position, to be stopped at the end of the runway while in the acceleration phase.

Preferably, the system comprises fourth means for calculating the expressions:

$$V_{min} = \sqrt{Vat^2 - 2\gamma_1t(D_1t - S.Dat)}$$ , and $$D_{min} = D_1t - (V_{11}t^2 - V_{min}^2)/2\gamma_1t$$

in which:

$V_{min}$ is the minimum speed of the aircraft enabling it, from its actual position $D_1t$ and with a positive constant acceleration $\gamma_1t$, to reach D1 at S.Dat. $D_{min}$ is the minimum distance travelled by the aircraft at the speed $V_{min}$ enabling it to reach, at a positive constant acceleration $\gamma_1t$, the position $D_1t$ at the speed $V_{11}t$, still in the acceleration phase.

According to another characteristic of the invention, the system comprises fifth means for calculating the expression:

$$D_{stop}' = D_1t - (V_{11}t^2)/2\gamma_1t$$

$D_{stop}'$ representing the position on the runway where the aircraft must stop when the latter is already in the braking phase, that is to say after interruption of the take-off procedure (γ₁t<0). This makes it possible, once the pilot has undertaken to interrupt the take-off, to help him manage the braking of the aircraft properly, by continuously giving him information on the position on the runway where the aircraft will stop and, therefore, the length of runway remaining (braking margin).

In this latter case, it is possible to provide sixth means for calculating the expression:

$$V_{max}' = \sqrt{-2\gamma_1t(L - D_1t)}$$ , $V_{max}'$ being the maximum speed of the aircraft when the latter is in the braking phase (γ₁t<0) enabling it, from its actual position, to stop at the end of the runway.

The figures of the appended drawing will make it clear how the invention may be realized. In these figures, identical references designate similar elements.

Figure 1:
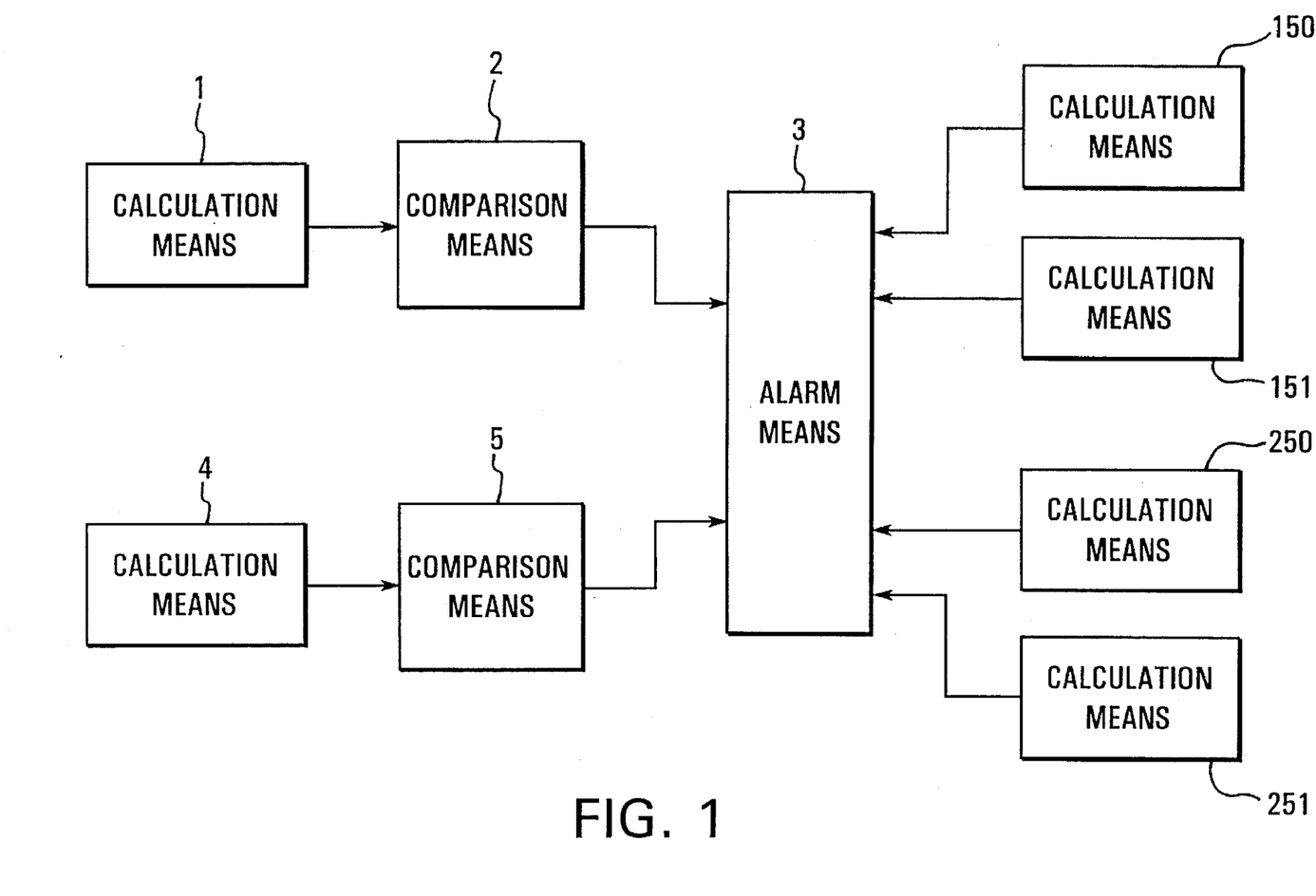
FIG. 1 is a block diagram of an embodiment of the system according to the invention.

With regard to FIG. 1, a system for deriving an information, warning or alarm signal on board an aircraft in the event of an anomaly during take-off, before the aircraft reaches a critical rolling speed up to which the take-off procedure may be modified or interrupted and beyond which the take-off must be proceeded with, includes:

first means 1 for calculating the expression:

$$D_1 = D_1t + (Vat^2 - V_{11}t^2)/2\gamma_1t$$

in which:

γ₁t is the actual acceleration of the aircraft at the instant t, $V_{11}t$ is the actual speed of the aircraft at the instant t, Vat is the theoretical speed of the aircraft at the instant t, $D_1t$ is the actual distance travelled by the aircraft at the instant t, and $D_1$ is the anticipated actual distance travelled by the aircraft when $V_{11}t$ will be equal to Vat, as well as the ratio:

$D_1/Dat$ in which:

$D_1$ is as defined above, and

Dat is the theoretical distance travelled by the aircraft at the instant t;

first means 2 for comparing the ratio $D_1/Dat$ to a predetermined threshold S; and information, warning or alarm means 3.

As already indicated, this is generally known from the aforementioned patent FR-2,650,101.

More particularly, according to the invention, said system comprises, in addition:

second means 4 for calculating the expression:

$$D_{stop}=D_1t+V_{11}t(\Delta T1+\Delta T2)-1/\gamma P[\gamma ct/\gamma P(\ln|\gamma ct|-1)+V_{11}t\ln|\gamma bt|-\gamma bt/\gamma P(\ln|\gamma bt|-1)]$$

in which, in addition to the parameters already defined hereinabove:

ΔT1 is the reaction time of the aircraft's pilot,
ΔT2 is the response time of the braking means,
γbt is the acceleration of the aircraft at the start of braking,
γct is the acceleration of the aircraft at the end of braking,
γP=(γbt−γct)/$V_{11}$t, $D_{stop}$ represents the position on the runway where the aircraft must stop if the pilot decides to interrupt the take-off procedure immediately, that is to say is representative of the stopping distance of the aircraft during the acceleration phase of the latter at take-off;

second means for comparing $D_{stop}$ to the length of runway L available so as to determine whether an interruption of the take-off is still possible.

As will be seen in more detail later, the information, warning or alarm means 3 are activated depending on the information supplied by said first 2 and second 5 comparison means in order to enable the pilot to decide whether to continue the take-off procedure or not.

Figure 2:
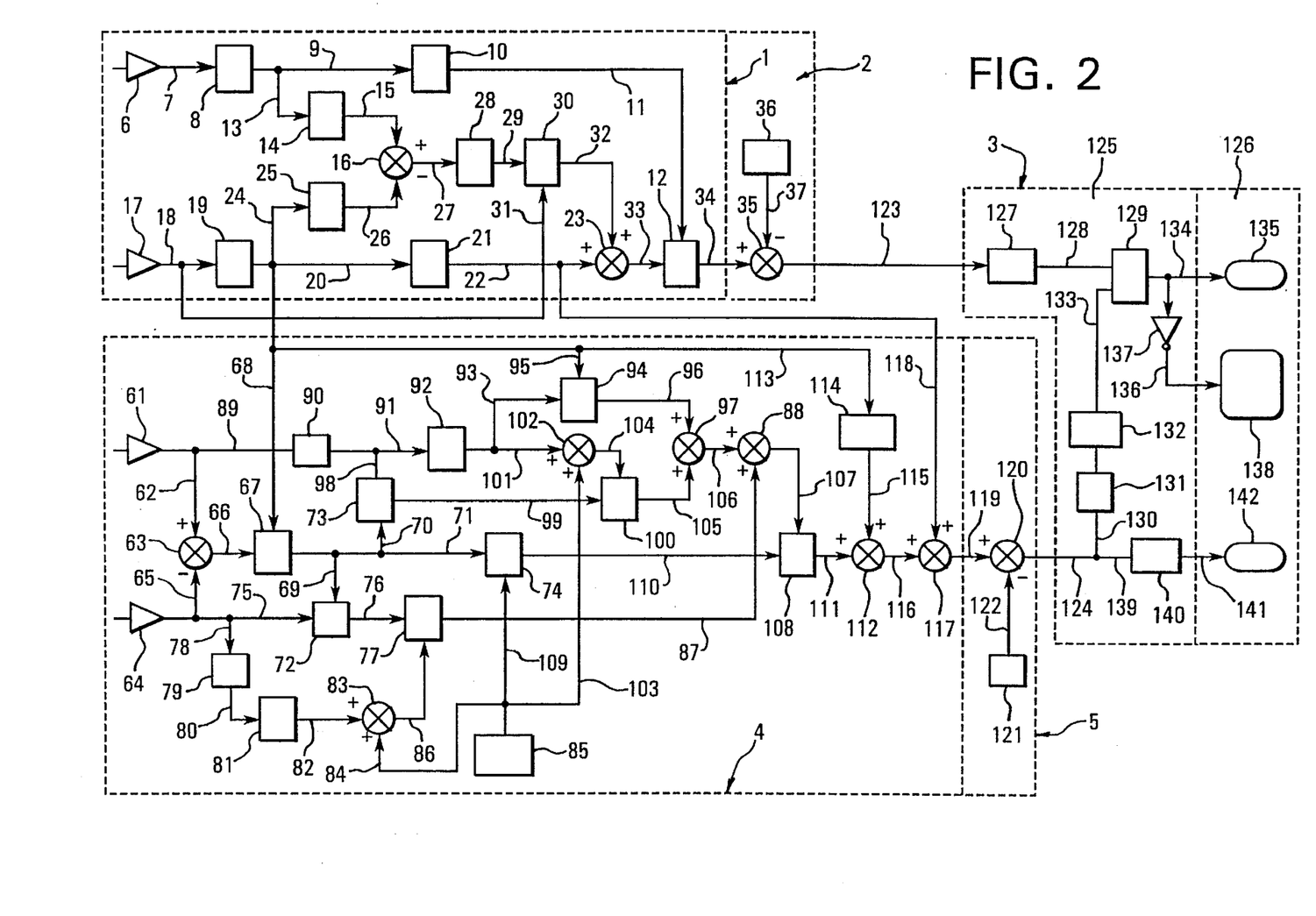
FIG. 2 is a diagram illustrating the calculation of information supplied by the system according to the invention, as well as the displays resulting therefrom.

The first calculation means 1 will be described more specifically hereinbelow with regard to FIG. 2. The theoretical acceleration γat, the determination of which will be explained below with regard to FIG. 3, coming from 6 and conveyed via the link 7, is applied to the input of an integrator 8, capable of supplying at its output the theoretical speed Vat, which is applied, via the link 9, to an integrator 10 capable of supplying at its output the theoretical distance Dat, which is in turn applied, via the link 11, to the input, corresponding to the denominator, of a divider 12. In addition, the theoretical speed Vat is applied, via the link 13, to a computer 14 capable of supplying at its output the value $Vat^2$ applied, via the link 15, to the positive input of a subtracter 16.

Likewise, the actual acceleration $\gamma_1$t, coming from 17 and conveyed via the link 18, is applied to the input of an integrator 19, capable of supplying at its output the actual speed $V_{11}$t, which is applied, via the link 20, to an integrator 21 capable of supplying at its output the actual distance $D_1$t, which is applied, via the link 22, to one of the inputs of an adder 23. Moreover, the actual speed $V_{11}$t is applied, via the link 24, to a computer 25 capable of supplying at its output the value $V_{11}t^2$ applied, via the link 26, to the negative input of the subtracter 16.

The subtracter 16, which supplies the value (Vat²−$V_{11}t^2$) at its output, is connected, via the link 27, to a computer 28 capable of supplying at its output the value (Vat²−$V_{11}t^2$)/2, which is applied, via the link 29, to the input, corresponding to the numerator, of a divider 30. In addition, the actual acceleration $\gamma_1$t is applied, via the link 31, to the input, corresponding to the denominator of the divider 30. The output of the divider 30, supplying the value (Vat²−$V_{11}t^2$)/2$\gamma_1$t, is connected, via the link 32, to the other input of the adder 23, supplying at its output, the value $D_1=D_1t+(Vat^2-V_{11}t^2)/2\gamma_1t$, which is conveyed, via the link 33, to the input, corresponding to the numerator, of the divider 12 supplying the value $D_1$/Dat at its output.

In the first comparison means 2, the ratio $D_1$/Dat is supplied, via the link 34, to the positive input of a subtracter 35, which receives, at its negative input, the predetermined threshold value S (especially equal to 1.15) coming from 36 via the link 37.

Figure 3:
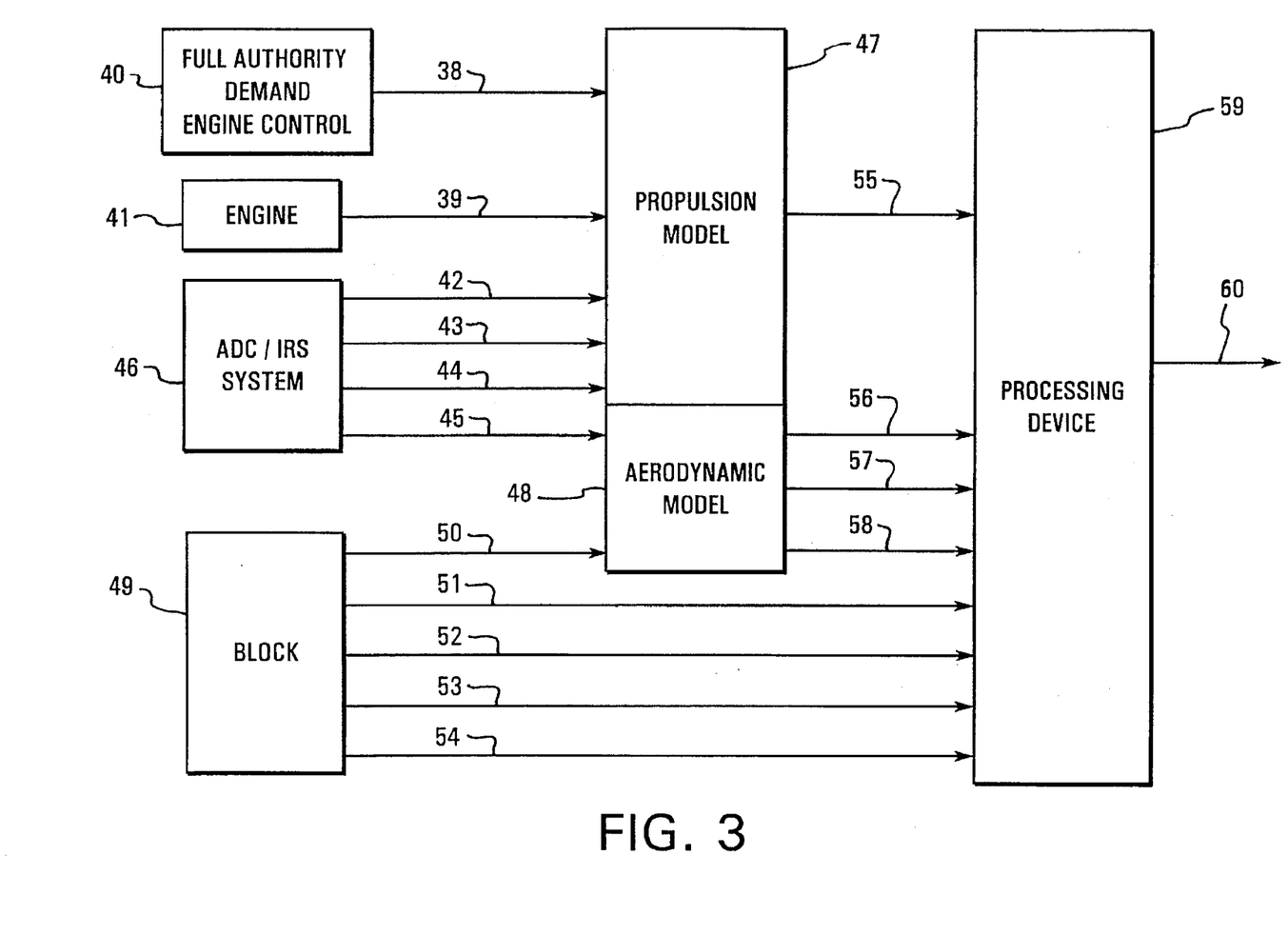
FIG. 3 is a block diagram illustrating the principle of the calculation of the theoretical acceleration.

FIG. 3 shows diagrammatically how the theoretical acceleration γat may be determined. On the one hand, the speeds N1 of the theoretical 38 and actual 39 engines are supplied from the FADEC ("Full Authority Demand Engine Control") 40 and from the engines 41 and, on the other hand, the ambient temperature 42, the ambient pressure 43, the Mach 44 and VTAS 45 are supplied from the ADC/IRS ("Air Data Computer"/"Inertial Reference System") system 46, in order to generate a propulsion model 47 and an aerodynamic model 48. Moreover, from the block 49 corresponding to the inputs supplied by the pilot, it is possible to obtain the position of the leading edges and the flaps 50 (which position is supplied to the aerodynamic model 48), the weight 51, the length of runway 52, the slope of the runway 53 and the state of the runway 54. The thrust 55 is obtained as output of the propulsion model and VTAS 56, the lift of the aircraft (Rz) 57 and the drag of the aircraft (Rx) 58 are obtained as output of the aerodynamic model. These various parameters, as well as the aforementioned parameters 51 to 54, are supplied to a processing device 59 which, on the basis of the laws of mechanics and of a rolling model, supplies, as output 60, the theoretical acceleration γat.

Furthermore, it should be noted that, on the one hand, the actual acceleration $\gamma_1$t is measured by the aircraft's inertial unit and that, on the other hand, the theoretical acceleration at the start of braking γbt and the theoretical acceleration at the end of braking γct are calculated in the same way as γat, with the following assumptions:

for the calculation of γbt, it is assumed that the speed of the engines is the reduced speed (slowed N1),
for the calculation of γct, it is assumed that the speed of the engines is the reduced speed and that the speed of the aircraft is zero.

Once again with regard to FIG. 2, the acceleration at the start of braking γbt, coming from 61 and conveyed via the link 62, is applied to the positive input of a subtracter 63, while the acceleration at the end of braking γct, coming from 64 and conveyed via the link 65, is applied to the negative input of the subtracter 63. The latter, which supplies at its output the value γbt−γct, is connected, via the link 66, to the input, corresponding to the numerator, of a divider 67. Moreover, the input, corresponding to the denominator, of the divider 67 is connected, via the link 68, to the output of the integrator 19 so that supplied at the output of the divider 67 is the value γbt−γct/$V_{11}$t =γP, which via the respective links 69, 70 and 71, is supplied to the inputs, corresponding each time to the denominator, of the respective dividers 72, 73 and 74. The acceleration at the end of braking γct is applied, via the link 75, to the input, corresponding to the numerator, of the divider 72. The value obtained at the output of the divider 72, γct/γP, is applied, via the link 76, to the input of a multiplier 77. Moreover, the acceleration at the end of braking γct is applied, via the link 78, to a multiplier 79 for multiplying its value by −1, the output of which is applied, via the link 80, to a computer 81 supplying, as output, the value ln|γct|, which is applied, via the link 82, to one input of an adder 83, the other input of which receives, via the link 84, the value −1 supplied at 85. The value ln|γct|−1 is supplied, via the link 86, to the other input of the multiplier 77, delivering, at its output, the value γct/γP(ln|γct|−1) applied, via a link 87, to one input of an adder 88.

Moreover, the acceleration at the start of braking γbt, is applied, via the link 89, to a multiplier 90 which multiplies its value by −1, the output of which is applied, via the link 91, to a computer 92 supplying, as output, the value ln|γbt| which is applied via the link 93, to one input of a multiplier 94, the other input of which receives, via the link 95, the value $V_{11}t$. The output, of value $V_{11}t \ln|\gamma bt|$, of the multiplier 94 is applied, via the link 96, to one input of an adder 97.

The acceleration at the start of braking $\gamma bt$ (multiplied by −1) is also applied, via the link 98, to the input, corresponding to the numerator, of the divider 73 supplying, at its output, the value $-\gamma bt/\gamma P$, which is applied, via the link 99, to one input of a multiplier 100. In addition, the value $\ln|\gamma bt|$ is applied, via the link 101, to one input of an adder 102, the other input of which receives, via the link 103, the value −1 coming from 85. The value $\ln|\gamma bt|-1$, output by the adder 102, is applied, via the link 104, to the other input of the multiplier 100, the output of which, of value $-\gamma bt/\gamma P (\ln|\gamma bt|-1)$, is applied, via the link 105, to the other input of the adder 97. The value output by the latter is applied, via the link 106, to the other input of the adder 88. The adder 88 therefore gives, as output, the value: $A = \gamma ct/\gamma P (\ln|\gamma ct|-1) + V_{11}t \ln|\gamma bt| - \gamma bt/\gamma P (\ln|\gamma bt|-1)$, applied, via the link 107, to one input of a multiplier 108.

In addition, the input, corresponding to the numerator, of the divider 74 receives, via the link 109, the value −1 from 85. The output, of value $-1/\gamma P$, of the divider 74 is applied, via the link 110, to the other input of the multiplier 108. The value $-1/\gamma P.A$ output by the latter is applied, via the link 111, to one input of an adder 112 receiving, at its other input, the value $V_{11} t (\Delta T1+\Delta T2)$ coming, for $V_{11}t$, from the integrator 19 via the link 113, which terminates in the computer 114 supplying said value at its output and applying it, via the link 115, to said other input. The output of the adder 112 is connected, via a link 116, to an adder 117 receiving at its other input, the value $D_1 t$ from the integrator 21 via the link 118.

The output of the adder 117, being a value $D_1 t + V_{11}t(\Delta T1+\Delta T2) - 1/\gamma P.A = D_{stop}$, is applied, via the link 119, to the positive input of a substractor 120, the negative input of which receives, via the link 122, the length of runway parameter L from 121.

The calculation of the distance D travelled by the aircraft during the actual braking phase until the aircraft has stopped, that is to say excluding the distance travelled during the pilot's reaction time ($\Delta T1$) and the response time of the braking means ($\Delta T2$), is carried out in the following way. During this actual braking period, the speed goes from Vbt (speed at the start of braking) to 0 and the acceleration goes from $\gamma bt$ to $\gamma ct$. For the calculation of $\gamma bt$, it is assumed that, at the start of effective braking, the speed of the engines has already been stabilized to the reduced speed, which, in fact, does not quite correspond to reality. We have:

$\gamma bt = \gamma at$ (theoretical acceleration) with V=Vbt and the speed of the engines equal to the reduced speed;

$\gamma ct = \gamma at$ (theoretical acceleration) with V=0 and the speed of the engines equal to the reduced speed.

In order to calculate the actual braking distance D, it is assumed that values ($\gamma = \gamma bt$, V=Vbt) change to values ($\gamma = \gamma ct$, V=0) according to a curve of the form $\gamma = aV+b$.

We then have:

$$D = \int_{V=Vbt}^{V=0} (VdV)/(aV+b) =$$

$$1/a \cdot [V \cdot \ln(aV+b) - (aV+b)/a \cdot \ln(aV+b) - 1)] \Big|_{V=Vbt}^{V=0}$$

hence, if $\gamma P = (\gamma bt - \gamma ct)/Vbt$, $D = -1/\gamma P [(\gamma ct)/\gamma P.(\ln|\gamma ct|-1) + Vbt.\ln|\gamma bt| - \gamma bt/\gamma P.(\ln|\gamma bt|-1)]$ with, in fact: $Vbt = V_{11}t$.

The value $D_1/Dat-S$, obtained as output of the first comparison means 2, as well as the value $D_{stop}-L$, obtained as output of the second comparison means 5, are supplied, via the respective links 123 and 124, to the information, warning or alarm means 3. These means comprise a processing subassembly 125 and a display subassembly 126. The value $D_1/Dat-S$ passes through a first logic operator 127 supplying, at its output, the logic value 0 if $D_1/Dat-S \leq 0$ and the logic value 1 if $D_1/Dat-S > 0$, said logic value being sent, via a link 128, to the input of a switch 129 controlled by the logic value conveyed by the link 133. The value $D_{stop}-L$ passes, via the link 130 and by means of a multiplier 131 multi-plying its value by −1, through a second logic operator 132 supplying, at its output, the logic value 0 if the input value in said operator is negative or zero and the logic value 1 if the input value in said operator is positive. This logic value 0 or 1 is sent, via the link 133, to the control of the switch 129 so that when this logic value is 1 the switch is closed and when this value is 0 the switch is open. The output of the switch 129 is connected, via the link 134, to a first display 135 which displays, when it is activated (logic value 1), the information STOP and, via the link 136 and via a logic-value invertor 137, to a second display 138 which displays, when it is activated (logic value 1), the information STOP or TAKE OFF. Moreover, the value $D_{stop}-L$ passes, via the link 139, through a third logic operator 140 supplying, at its output, the logic value 0 if $D_{stop}-L \leq 0$ and the logic value 1 if $D_{stop}-L > 0$, said logic value being applied, via a link 141, to a third display 142 which displays, when it is activated (logic value 1) the information TAKE OFF.

Thus, it may be seen that:

1/ if $D_1/Dat-S<0$ and $D_{stop}-L<0$, the display 138 will supply the information STOP or TAKE OFF;

2/ if $D_1/Dat-S<0$ and $D_{stop}-L>0$, the display 142 will supply the information TAKE OFF (the displays 135 and 138 are not supplied);

3/ if $D_1/Dat-S>0$ and $D_{stop}-L<0$, the display 135 will supply the information STOP;

4/ if $D_1/Dat-S>0$ and $D_{stop}-L>0$, the display 142 will supply the information TAKE OFF (the displays 135 and 138 are not supplied).

Once again with regard to FIG. 1, the system according to the invention may also comprise third means 150 for calculating the expression:

$$V_{max} = \sqrt{V_{11}t^2 - 2\gamma bt(L - D_{stop})} \quad ,$$

$V_{max}$ being the maximum speed of the aircraft in the acceleration phase enabling it, from its actual position, to be stopped at the end of the runway in the event of an immediate interruption of the take-off; as well as fourth means 151 for calculating the expressions:

$$V_{min} = \sqrt{Vat^2 - 2\gamma_1 t(D_1 t - S.Dat)} \quad ,$$

and $$D_{min} = D_1 t - (V_{11}t^2 - V_{min}^2)/2\gamma_1 t$$

in which:

$V_{min}$ is the minimum speed of the aircraft in the acceleration phase enabling it, from its actual position $D_1 t$ and with a positive constant acceleration $\gamma_1 t$, to reach D1 at S.Dat, $D_{min}$ is the minimum distance travelled by the aircraft at the speed $V_{min}$ enabling it to reach, at a positive constant acceleration $\gamma_1 t$, the position $D_1 t$ at the speed $V_{11} t$. Said information may likewise be supplied to said information, warning or alarm means 3, in order to be displayed thereat.

Figure 4:
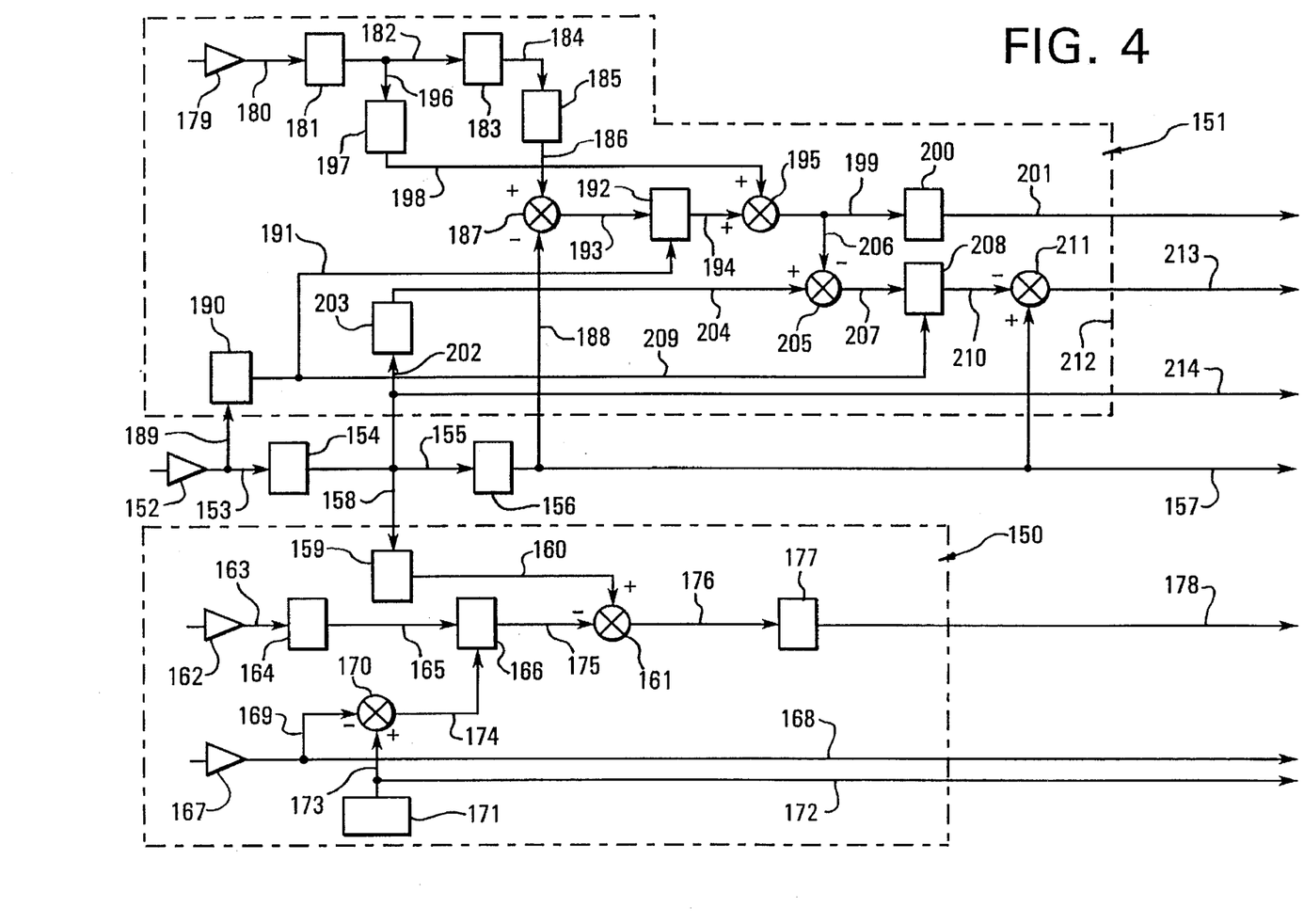
FIG. 4 is a diagram illustrating the calculation of additional information supplied by the system according to the invention during the acceleration phase of the aircraft at take-off.

The calculation of these various expressions, supplying the pilot with new information still during the acceleration phase of the take-off, is explained with regard to FIG. 4.

As previously, from the actual acceleration $\gamma_1 t$, coming from 152 and sent via the link 153 to the integrator 154, the actual speed $V_{11} t$ is obtained and applied, via the link 155 to the integrator 156 supplying, at its output, the actual distance travelled $D_1 t$ at 157. It is clear that such values may also be derived from the corresponding "branch" of the calculation means shown in FIG. 2.

The actual speed $V_{11} t$ is applied, via the link 158, to a computer 159 supplying, at its output, the value $V_{11} t^2$, this latter value being applied, via the link 160, to the positive input of a subtracter 161. Moreover, the acceleration at the start of braking $\gamma bt$, coming from 162, is applied, via the link 163, to a computer 164 supplying, at its output, the value $2\gamma bt$, this latter value being applied, via the link 165, to a first input of a multiplier 166. In addition, $D_{stop}$, calculated in accordance with the diagram in FIG. 2 and coming from 167, is delivered, as such, at 168 and applied, via the link 169, to the negative input of a subtracter 170. The runway length L, coming from 171, is supplied at 172 and applied, via the link 173, to the positive input of the subtracter 170. The value $(L-D_{stop})$ is supplied, via the link 174, to the other input of the multiplier 166. The value $2\gamma bt(L-D_{stop})$, obtained at the output of the latter, is applied, via the link 175 to the negative input of the subtracter 161 in order to supply, as output, the value $V_{11} t^2 - 2\gamma bt(L-D_{stop})$. The latter is applied, via the link 176, to a computer 177 supplying, at its output 178, the value:

$$\sqrt{V_{11} t^2 - 2\gamma bt(L - D_{stop})} = V_{max}.$$

As previously, the theoretical speed Vat is obtained from the theoretical acceleration $\gamma at$, coming from 179 and applied, via the link 180, to the integrator 181, and this theoretical speed Vat is applied, via the link 182 to the integrator 183 in order to obtain the theoretical distance Dat applied, via the link 184, to the computer 185 supplying, as output, the value S.Dat (S is the previously defined threshold, the value of which is, for example, equal to 1.15). This latter value is applied, via the link 186 to the negative input of a subtracter 187, at the positive input of which the actual distance $D_1 t$ is applied via the link 188. Furthermore, the actual acceleration $\gamma_1 t$ is applied, via the link 189, to a computer 190 supplying at its output, the value $2\gamma_1 t$. This latter value is applied, via the link 191, to one input of a multiplier 192, the other input of which receives, via the link 193, the value $(D_1 t - S.Dat)$. The value $2\gamma_1 t(D_1 t - S.Dat)$, output by the multiplier 192, is applied, via the link 194, to one input of an adder 195. The theoretical speed Vat is applied, via the link 196, to a computer 197 supplying, at its output, the value $Vat^2$ applied, via the link 198, to the other input of the adder 195. The value output by the latter, $Vat^2 + 2\gamma_1 t (D_1 t - S.Dat)$, is applied, via the link 199, to a computer 200 supplying at its output 201 the value:

$$\sqrt{Vat^2 + 2\gamma_1 t(D_1 t - S.Dat)} = V_{min}.$$

Moreover, the actual speed $V_{11} t$ is applied, via the link 202, to a computer 203 supplying, at its output, the value $V_{11} t^2$, which is applied, via the link 204, to the positive input of a subtracter 205, the negative input of which receives, via the link 206, the value $V_{min}^2$. The value $V_{11} t^2 - V_{min}^2$ is applied, via the link 207, to the input, corresponding to the numerator, of a divider 208, the input of which, corresponding to the denominator, receives, via the link 209, the value $2\gamma_1 t$. The resulting value, $(V_{11} t^2 - V_{min}^2)/2\gamma_1 t$ is applied, via the link 210, to the negative input of a subtracter 211, the positive input of which receives, via the link 212, the value $D_1 t$. The output 213 of the subtracter 211 supplies the value:

$$D_1 t - (V_{11} t^2 - V_{min}^2)/2\gamma_1 t = D_{min}.$$

The value Vut may also be output at 214.

A few details regarding the determination of the above expressions will be given hereinbelow.

$V_{min}$ is the minimum speed which the aircraft must have at the instant $t$ and at the position $D_1 t$ in order to be able to reach the speed Vat at the point $D_1 = S.Dat$ at the instant $t+\Delta t$. We may therefore write:

$$V_{11}(t+\Delta t) = Vat = V_{min} + \gamma_1 t \Delta t$$

$$D1 (t+\Delta t) = Dat.S = D_1 t + V_{min} \cdot \Delta t + \frac{1}{2} \gamma_1 t \Delta t^2$$

hence:

$$V_{min} = \sqrt{Vat^2 + 2\gamma_1 t [D_1 t - Dat.S]}$$

$D_{min}$ is the minimum distance which the aircraft must have travelled at $V_{min}$ in order to be at $D_1 t$ with $V_{11} t$. We have:

$$V_{11} t = V_{min} + \gamma t \cdot \Delta t$$

$$D_1 t = D_{min} + V_{min} \cdot \Delta t + \frac{1}{2} \gamma_1 t \Delta t^2$$

hence:

$$D_{min} = D_1 t - (V_{11} t^2 - V_{min}^2)/2\gamma_1 t$$

$V_{max}$ is the maximum speed of the aircraft at $D_1 t$, enabling it still to stop on the runway. It is therefore the speed of the aircraft at $D_1 t$ enabling the latter to stop at the end of the runway in the event of immediate interruption of the take-off. The concept of $V_{max}$ simply uses the calculation of the stopping distance $D_{stop}$.

With regard to FIG. 1, the system according to the invention may, in addition, comprise fifth means 250 for calculating the expression:

$$D_{stop}' = D_1 t - (V_{11} t^2)/2\gamma_1 t,$$

$D_{stop}'$ representing the position on the runway where the aircraft must stop when the latter is already in the braking phase, that is to say after interruption of the take-off procedure, as well as sixth means 251 for calculating the expression:

$$V_{max}' = \sqrt{-2\gamma_1 t(L - D_1 t)},$$

$V_{max}'$ being the maximum speed of the aircraft enabling it, from its actual position, to stop at the end of the runway. Said information may likewise be supplied to said information, warning or alarm means 3, in order to be displayed thereat.

Figure 5:
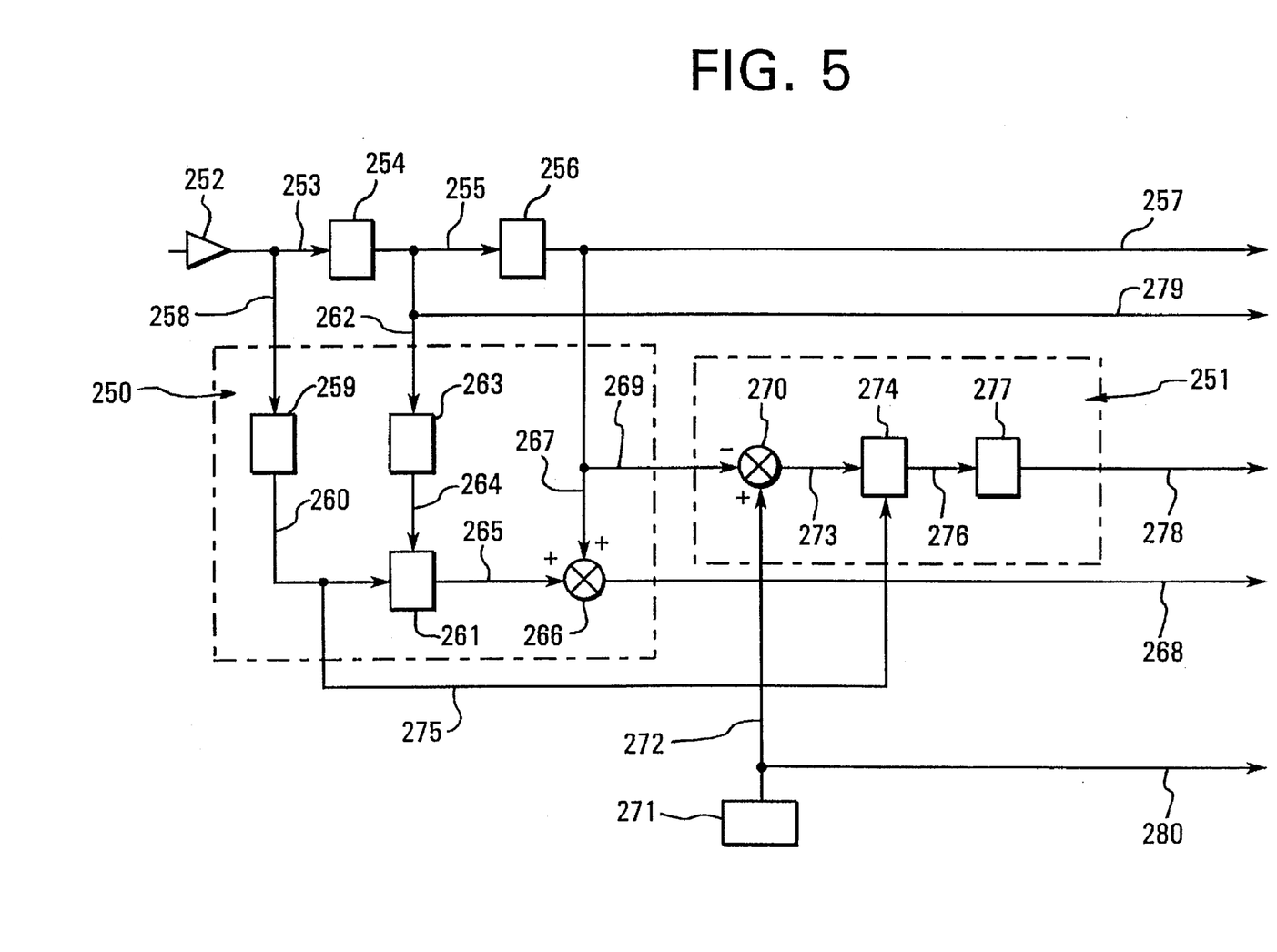
FIG. 5 is a diagram illustrating the calculation of information supplied by the system according to the invention during the braking phase of the aircraft.

The calculation of these two expressions is explained with regard to FIG. 5.

The actual acceleration $\gamma_1 t$, coming from 252, is applied, via the link 253, to the integrator 254 supplying the actual speed $V_{11} t$ applied, via the link 255 to the integrator 256 supplying, at output 257, the actual distance $D_1 t$.

The actual acceleration $\gamma_1 t$ is, moreover, applied, via the link 258, to a computer 259 supplying, at its output, the value $-2\gamma_1 t$, which is applied, via the link 260, to the input, corresponding to the denominator, of a divider 261. The actual speed $V_{11} t$ is applied, via the link 262, to the input of a calculator 263 supplying, at its output, the value $V_{11} t^2$ which is applied, via the link 264, to the input, corresponding to the numerator, of the divider 261. The value, $-(V_{11} t^2)/2\gamma_1 t$, coming from the latter, is applied, via the link 265, to one input of an adder 266, the other input of which receives, via the link 267, the value $D_1 t$. The output 268 of the adder 266 delivers the value:

$$D_1 t - (V_{11} t^2)/2\gamma_1 t = D_{stop}'.$$

Furthermore, the value $D_1 t$ is applied, via the link 269, to the negative input of a subtracter 270, the positive input of which receives the length of runway value L, coming, via the link 272, from 271. The value $L-D_1 t$ output by the subtracter 270 is applied, via the link 273, to one input of a multiplier 274, the other input of which receives, via the link 275, the value $-2\gamma_1 t$. The output of the multiplier 274, of value $-2\gamma_1 t(L-D_1 t)$, is applied, via the link 276, to a computer 277 supplying at output 278, the value:

$$\sqrt{-2\gamma_1 t(L - D_1 t)} = V_{max}'.$$

The values $V_{11} t$ and L may be output, respectively, at 279 and 280.

A few details regarding the determination of the above expressions (braking phase) will be given hereinbelow.

In the braking phase, the stopping distance $D_{stop}'$ is only calculated if the aircraft has spent more than 5 seconds in the braking phase (which makes it possible to avoid doing the calculations during the transitory phases of reducing the speeds of the engines). At this moment, the speeds of the engines may be regarded as stabilized to the reduced speeds. In order to calculate the stopping distance, it is assumed that the acceleration remains constant and is equal to the actual acceleration. This in fact represents an optimistic solution when the aircraft is at the start of braking (calculated stopping distance <actual stopping distance). However, the further into the braking phase, the closer one approaches reality.

We therefore obtain:

$$V=0=V_{11} t + \gamma_1 t + \Delta t$$

$$D_{stop}' = D_1 t + V_{11} t \cdot \Delta t + \tfrac{1}{2} \gamma_1 t \cdot \Delta t^2$$

i.e.:

$$D_{stop}' = D_1 t - (V_{11} t^2)/2\gamma_1 t$$

$V_{max}'$ is obtained directly using the equations:

$$V=0=V_{max}' + \gamma_1 t \cdot \Delta t$$

$$L = D_1 t + V_{max}' \cdot \Delta t + \tfrac{1}{2} \gamma_1 t \cdot \Delta t^2$$

hence:

$$V_{max}' = \sqrt{-2\gamma_1 t(L - D_1 t)}$$

In conclusion, the system according to the invention enables the aircraft's pilot to anticipate his decision, to take different decisions depending on the situations and to take the best decision at the best moment.

We claim:

1. A system for deriving an information, warning or alarm signal on board an aircraft in the event of an anomaly during take-off, before the aircraft reaches a critical rolling speed up to which the take-off process may be modified or interrupted and beyond which the take-off must be proceeded with, of the type including:

(i) first means (1) for calculating the expression:

$$D_1 = D_1 t + (Vat^2 - V_{11} t^2)/2\gamma_1 t$$

in which:

$\gamma_1 t$ is the actual acceleration of the aircraft at the instant t, $V_{11} t$ is the actual speed of the aircraft at the instant t, Vat is the theoretical speed of the aircraft at the instant t, $D_1 t$ is the actual distance travelled by the aircraft at the instant t, and $D_1$ is the anticipated actual distance travelled by the aircraft when $V_{11} t$ will be equal to Vat, as well as the ratio:

$$D_1/Dat$$

in which:

$D_1$ is as defined above, and

Dat is the theoretical distance travelled by the aircraft at the instant t;

(ii) (b) first means (2) for comparing the ratio $D_1/Dat$ to a predetermined threshold S; and (iii) information, warning or alarm means (3); characterized in that it furthermore comprises:

(iv) second means (4) for calculating the expression:

$$D_{stop}=D_1 t+V_{11} t(\Delta T1+\Delta T2)-1/\gamma P[\gamma ct/\gamma P(\ln|\gamma ct|-1)+V_{11} t \ln|\gamma bt|-bt/\gamma P(\ln|\gamma bt|-1)]$$

in which, in addition to the parameters already defined hereinabove:

$\Delta T1$ is the reaction time of the aircraft's pilot, $\Delta T2$ is the response time of the braking means, $\gamma bt$ is the acceleration of the aircraft at the start of braking, $\gamma ct$ is the acceleration of the aircraft at the end of braking, $\gamma P = (\gamma bt - \gamma ct)/V_{11} t$, $D_{stop}$ represents the position on the runway where the aircraft must stop if the pilot decides to interrupt the take-off procedure immediately, that is to say is representative of the stopping distance of the aircraft during the acceleration phase of the latter at take-off;

(v) second means (5) for comparing $D_{stop}$ to the length of runway L available so as to determine whether an interruption of the take-off is still possible;

(vi) said information, warning or alarm means (3) being activated depending on the information supplied by said first (2) and second (5) comparison means in order to enable the pilot to decide whether he should continue the take-off procedure or not.

2. The system as claimed in claim 1, characterized in that it comprises fourth means (151) for calculating the expressions:

$$V_{min} = \sqrt{Va t^2 - 2\gamma_1 t(D_1 t - S.Dat)} \quad ,$$

and $$D_{min} = D_1 t - (V_{11} t^2 - V_{min}^2)/2\gamma_1 t$$

in which $V_{min}$ is the minimum speed of the aircraft in the acceleration phase enabling it, from its actual position $D_1 t$ and with a constant acceleration $\gamma_1 t > 0$, to reach D1 at S.Dat, $D_{min}$ is the minimum distance travelled by the aircraft at the speed $V_{min}$ enabling it to reach, at a constant acceleration $\gamma_1 t > 0$, the position $D_1 t$ at the speed $V_{11} t$.

3. The system as claimed in claim 1, characterized in that it comprises fifth means (250) for calculating the expression:

$$D_{stop}' = D_1 t - (V_{11} t^2)/2\gamma_1 t,$$

$D_{stop}'$ representing the position on the runway where the aircraft must stop when the latter is already in the braking phase, that is to say after interruption of the take-off procedure.

4. The system as claimed in claim 3, characterized in that it comprises sixth means (251) for calculating the expression:

$$V_{max}' = \sqrt{-2\gamma_1 t(L - D_1 t)} \quad ,$$

$V_{max}'$ being the maximum speed of the aircraft in the braking phase (actual acceleration $\gamma_1 t < 0$) enabling it, from its actual position, to stop at the end of the runway.

5. The system as claimed in claim 1, characterized in that it comprises third means (150) for calculating the expression:

$$V_{max} = \sqrt{V_{11}^2 - 2\gamma b t(L - D_{stop})} \quad ,$$

$V_{max}$ being the maximum speed of the aircraft in the acceleration phase enabling it, from its actual position, to be stopped at the end of the runway in the event of an immediate interruption of the take-off.

6. The system as claimed in claim 5, characterized in that it comprises fourth means (151) for calculating the expressions:

$$V_{min} = \sqrt{Va t^2 - 2\gamma_1 t(D_1 t - S.Dat)} \quad ,$$

and $$D_{min} = D_1 t - (V_{11} t^2 - V_{min}^2)/2\gamma_1 t$$

in which:

$V_{min}$ is the minimum speed of the aircraft in the acceleration phase enabling it, from its actual position $D_1 t$ and with a constant acceleration $\gamma_1 t > 0$, to reach D1 at S.Dat, $D_{min}$ is the minimum distance travelled by the aircraft at the speed $V_{min}$ enabling it to reach, at a constant acceleration $\gamma_1 t > 0$, the position $D_1 t$ at the speed $V_{11} t$.

7. The system as claimed in claim 6, characterized in that it comprises fifth means (250) for calculating the expression:

$$D_{stop}' = D_1 t - (V_{11} t^2)/2\gamma_1 t,$$

$D_{stop}'$ representing the position on the runway where the aircraft must stop when the latter is already in the braking phase, that is to say after interruption of the take-off procedure.

8. The system as claimed in claim 7, characterized in that it comprises sixth means (251) for calculating the expression:

$$V_{max}' = \sqrt{-2\gamma_1 t(L - D_1 t)} \quad ,$$

$V_{max}'$ being the maximum speed of the aircraft in the braking phase (actual acceleration $\gamma_1 t < 0$) enabling it, from its actual position, to stop at the end of the runway.

* * * * *